United States Patent [19]

Beacham

[11] 3,728,489

[45] Apr. 17, 1973

[54] TELEPHONE ANSWERING APPARATUS

[75] Inventor: Walter Gary Beacham, Norfolk, Va.

[73] Assignee: BTI, Ltd., Norfolk, Va.

[22] Filed: May 23, 1972

[21] Appl. No.: 256,142

[52] U.S. Cl. .......... 179/6 R

[51] Int. Cl. .......... H04n 1/64

[58] Field of Search .......... 179/6 R, 6 AC, 6 C, 179/6 E, 2 R, 2 A, 1 C, 2 C, 84 R, 84 A

[56] References Cited

UNITED STATES PATENTS

| | | | |
|---|---|---|---|
| 3,445,600 | 5/1969 | Todd | 179/6 R |
| 3,592,968 | 7/1971 | Ogawa | 179/6 R |
| 3,499,993 | 3/1970 | Owen et al. | 179/6 AC |
| 3,590,160 | 6/1971 | Mert | 179/6 R |
| 3,586,779 | 6/1971 | Chernack | 179/6 R |
| 3,683,122 | 8/1972 | Kalju | 179/84 R |

*Primary Examiner*—Raymond F. Cardillo, Jr.
*Attorney*—Rupert J. Brady et al.

[57] ABSTRACT

A telephone answering system with recording and playback modes. The system is coupled to a telephone line and is electrically independent of the telephone set with which it operates. The system is actuated by a ring signal on a telephone line and includes a circuit which is responsive to the ring signal to interrupt and seize the phone line for a short interval. Thereafter a hold circuit coupled to the line feeds its output to a pulse noise rejection circuit which determines if a true call is on the line and if so triggers a control circuit which causes a prerecorded message on a first tape recorder to be transmitted to the caller. Afterward, the system will couple any spoken message from the calling party to a second tape recorder in response to the prerecorded message. The recorded messages on the second tape recorder from the calling party then may be played back later at will.

22 Claims, 6 Drawing Figures

TELEPHONE ANSWERING APPARATUS

BACKGROUND OF THE INVENTION

1. Field of the Invention

The present invention relates generally to electronic circuitry for telephone answering apparatus and more particularly an all solid state system which responds to the ring of a telephone which then starts an endless loop tape to play a recorded message to the calling party and thereafter recording a message from the caller which may be played back by the subscriber at a later time.

2. Description of the Prior Art

Numerous telephone answering devices are known by those skilled in the art. Generally, they are all designed to be activated when the telephone rings. A drive mechanism thereupon moves a tape when the incoming telephone lines are electrically coupled with the answering device. The tape is provided with a prerecorded message usually advising that the subscriber is absent, but the caller can, if desired, dictate a message which will be recorded and played back upon the subscriber's return. Means are also usually provided for the device to assume a standby state when the caller hangs up and remain in such standby state for a subsequent call.

Heretofore, such answering devices known in the art have been bulky, complex in installation, difficult to operate, and costly to produce and manufacture. The present invention, however, overcomes inherent disadvantages of prior art devices, both in operation and cost. All switching is accomplished by means of solid state circuitry comprised of semiconductive devices and integrated circuits. Furthermore, the system is fully independent in its electrical circuitry from the telephone set of the subscriber.

The following references constitute known prior art:

U.S. Pat. No. 3,445,600 — L.M. Todd
U.S. Pat. No. 3,586,779 — M.P. Chernack, et al.
U.S. Pat. No. 3,590,160 — K. Meri
U.S. Pat. No. 3,592,968 — K. Ogawa

SUMMARY

Briefly, the invention comprises means for answering a telephone in response to a ring signal on the line when no person is available in the immediate vicinity to pick up the receiver of the telephone set being called. The ringing signal is sensed by a novel ring detector circuit which interrupts and seizes the phone line by coupling a low impedance substantially equal to an answered (off-hook) telephone across the line for a period of not more than one second. At the end of one second, the ring detector turns off, removing the low impedance from the line and is no longer utilized until a subsequent ring signal is detected. When the ring circuit interrupts the telephone line with the low impedance, a hold circuit then acts to maintain seizure of the line by also coupling a second low impedance across the line. A pulse noise rejection circuit which has the function of eliminating unwanted pulses and initiating activation of an endless loop tape only when a caller stays on the line is coupled to the hold circuit. The endless loop tape recorder is coupled back to the telephone line and a prerecorded message is sent to the caller. At the end of the message, the tape recorder stops automatically. A one second tone pulse circuit is activated and an incoming message tape recorder is coupled to the telephone line. The present invention also includes circuitry for minimizing power drain by having power applied only to a minimum of circuitry while in a standby state; however, once the telephone line has been seized, power is applied to the remainder of the circuitry by closing a normally open ground return circuit in accordance with the operation of binary logic circuit configurations.

DESCRIPTION OF THE PREFERRED EMBODIMENT

Figure 1:
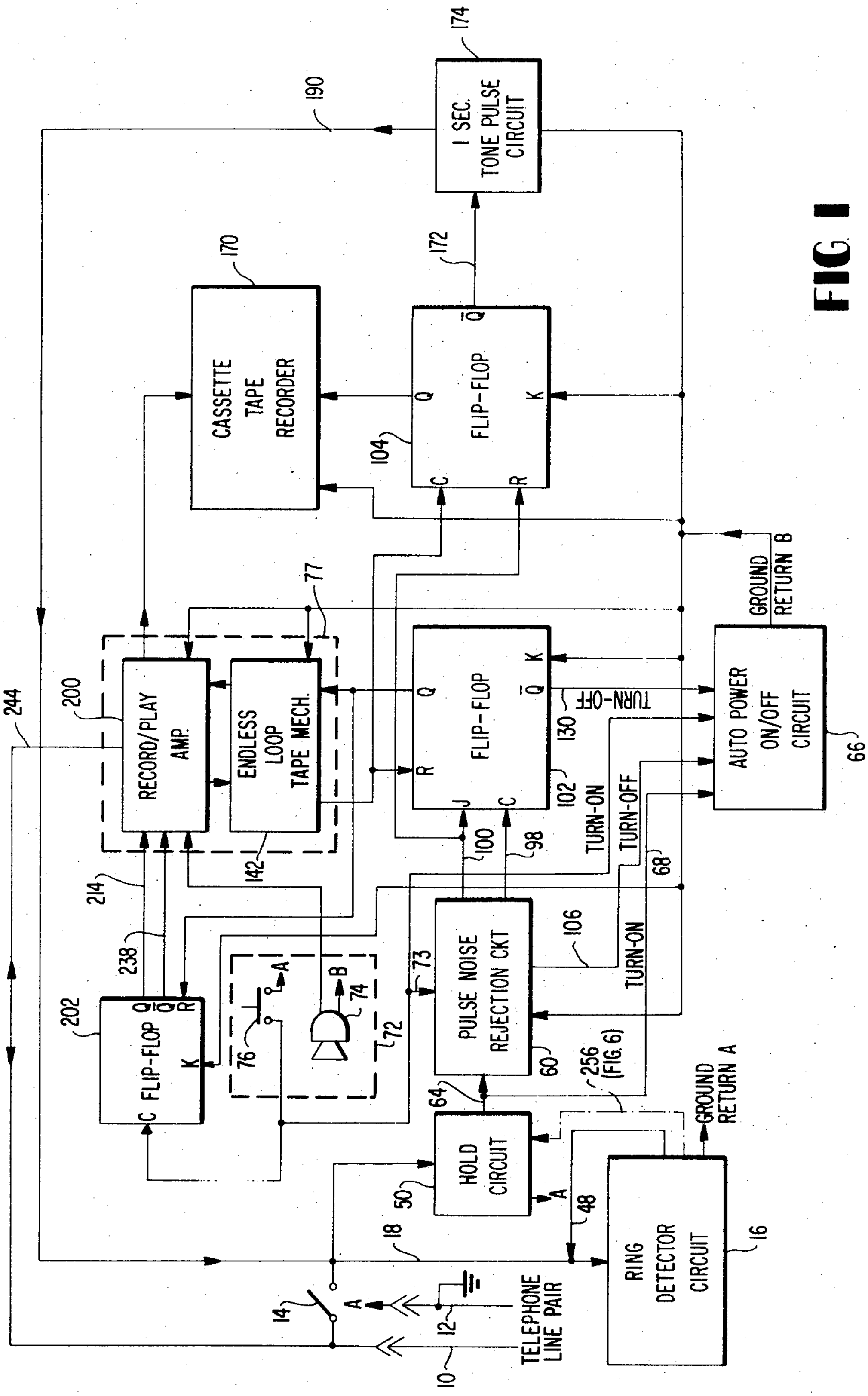
FIG. 1 is a composite electrical block diagram illustrative of the preferred embodiment of the subject invention.

Referring to the drawings and more particularly to FIG. 1, reference numerals 10 and 12 refer to a subscriber telephone line pair which respectively couple to a system ON/OFF switch 14 and a first ground return path A. Telephone line 10 is coupled through the ON/OFF switch 14 when closed to a ring detector circuit 16 by means of a circuit lead 18.

Figure 2:
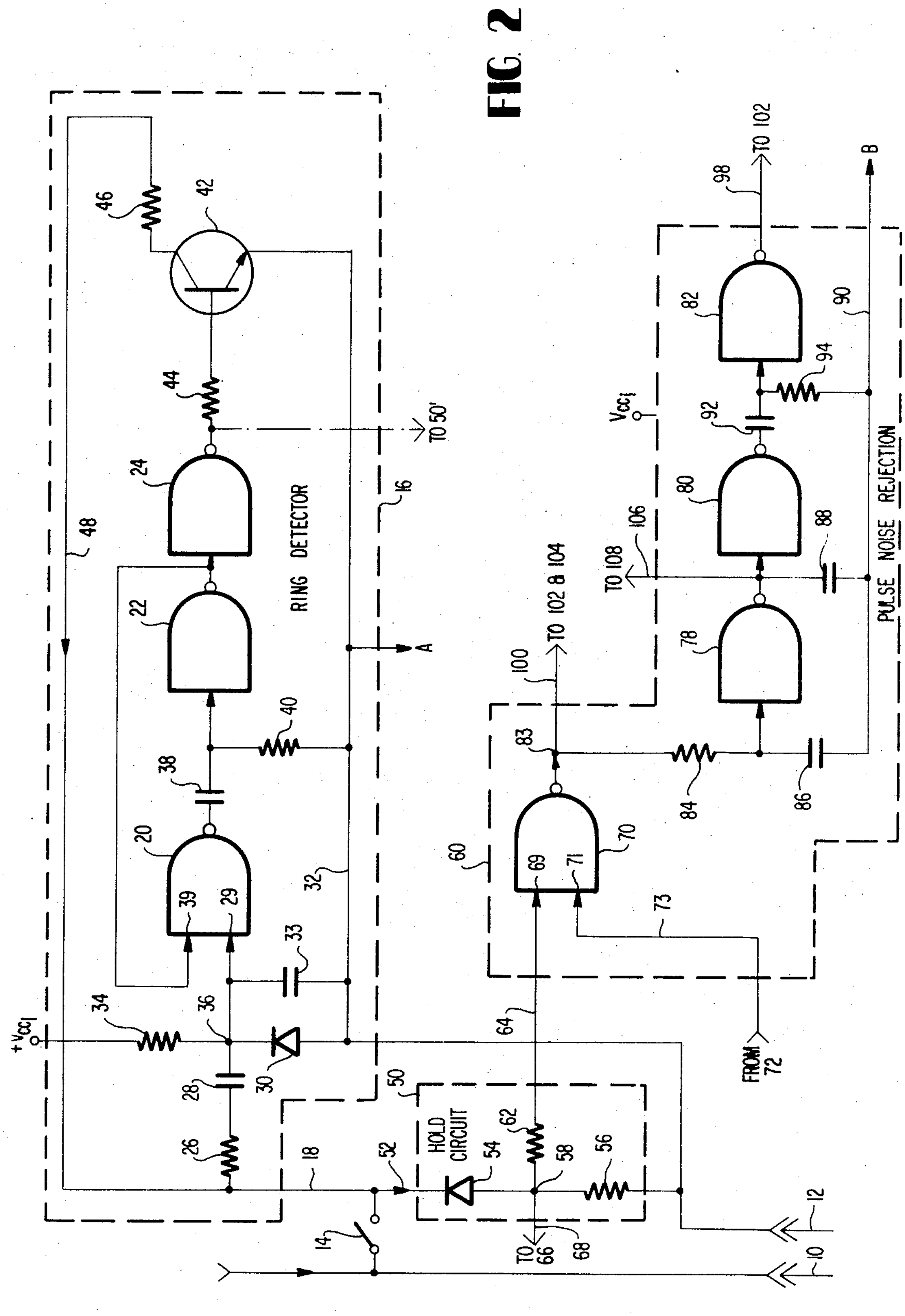
FIG. 2 is an electrical schematic diagram disclosing the ring detector circuit, the hold circuit and the pulse noise rejection circuitry associated with the embodiment shown in FIG. 1.

The ring detector circuitry 16 is shown in greater detail in FIG. 2 and includes, inter alia, three integrated circuit devices 20, 22 and 24 illustrated as NAND gates. Such devices are readily available as an integrated circuit package and depending upon the connections can be utilized either as a two input NAND gate such as disclosed with respect to reference numeral 20, or simply as single input logic inverters such as shown with respect to reference numerals 22 and 24. A typical example of such devices in a DM8000 quadruple two input NAND gate manufactured by the Radio Shack model number 276–020. A resistor 26 and a capacitor 28 series couple the circuit lead 18 to one input 29 of the NAND gate 20. A semiconductor diode 30 has its cathode coupled to input 29 while its anode is connected to a ground lead 32 which is common to the continuous ground return path A. A capacitor 33 is coupled across the semiconductor diode while a resistor 34 is connected from a supply source $+V_{cc_1}$ to circuit junction 36 which is common with input 29. The output of NAND gate 20 is coupled to the single input of the logic inverter 22 by means of the capacitor 38 and the resistor 40. The output of the logic inverter 22 is commonly coupled back to the other input 39 of the NAND gate 20 and the input of logic inverter 24. The output of logic inverter 24 is coupled to the base of transistor 42 by means of resistor 44. A collector load resistor 46 having a value substantially equal to the impedance of an "off-hook" telephone set, is connected back to the telephone line 10 by means of circuit lead 48 through the ON/OFF switch 14.

Power is continuously applied to the ring detector circuit 16 when the ON/OFF switch 14 is closed and as such remains in a STANDBY state. When an AC ring signal voltage appears across telephone lines 10 and 12, the voltage is coupled through resistor 26 and capacitor 28 where it is rectified to a DC voltage by means of the diode 30. The connection of the positive voltage $+V_{cc_1}$ through resistor 34 to input 29 of NAND gate 20 provides a binary logic "1" signal thereto. A binary "1" is defined as being substantially equal to $+V_{cc_1}$ or greater while a binary "0" is equal to 0 volts (ground) or less. However, the AC ring signal being rectified by the diode 30 charges capacitor 28, causing the input 29 to the NAND gate 20 to go to a binary "0" state. This also causes the output of NAND gate 20 to change from a "0" state to a "1" state on the incidence of the ring signal. The binary "1" state appearing at the output of NAND gate 20 is applied to the logic inverter 22 whose output immediately goes to a "0" state. This binary "0" level is applied to the other input 39 of the NAND gate 20 and to the input logic inverter 24, whose output to a binary "1". The binary "1" state of logic inverter 24 is next coupled to the base of transistor 42 turning it ON i.e., making it conductive and in doing so acts as a closed switch coupling resistor 46 across the telephone lines 10 and 12 thus seizing the line. This operation is equivalent to the called telephone set being answered. After a period of approximately one second, however, capacitor 38 charges through resistor 40 and the logic inverters 22 and 24 change state, causing transistor 42 to turn OFF and thus become nonconductive once again.

If the caller is still "on the line" at the end of the one second interval during which the ring circuit 16 couples the resistor 46 across the line pair, the voltage across the telephone lines 10 and 12 will go to a negative DC potential. A hold circuit 50 coupled to the telephone line 10 by means of the ON/OFF switch 14 and circuit lead 52 is responsive to the negative DC voltage across the telephone lines 10 and 12 to maintain seizure of the line. This circuit is also shown in FIG. 2 and comprises a semiconductor diode 54 coupled in series to resistor 56. Resistor 56 has its other end connected to the ground return A which is common to the grounded telephone line 12. The semiconductor diode 54 is poled such that it becomes conductive when the negative DC voltage appears across the telephone lines 10 and 12. Moreover, the value of resistor 56 is also chosen so that it is also substantially equal to an answered phone impedance and thus will hold the calling party after the ring detector circuit 16 removes resistor 46 which initially seized the telephone line pair.

With the telephone line pair 10 and 12 thus seized, a negative voltage appears across resistor 56 at circuit junction 58. This voltage is coupled to a pulse noise rejection circuit 60 by means of resistor 62 and circuit lead 64 and to the automatic power turn-on/off circuit 66 shown in FIGS. 1 and 4 by means of circuit lead 68. The pulse noise rejection circuit 60 is shown in detail in FIG. 2 and includes a NAND gate 70 having one input 69 coupled to circuit lead 64 from the hold circuit 50 while the other input 71 is connected to a push-button microphone 72 by means of circuit lead 73. The push-button microphone 72 is comprised of a microphone 74 and a push-button switch 76 and is utilized for purposes of recording a message on an endless loop tape recorder 77 (FIG. 1) for playback to a calling party. The output of the NAND gate 70 is fed to a 0.1 sec. time delay circuit comprised of single input logic inverters 78, 80 and 82 and associated circuit components. The output of NAND gate 70 is coupled from junction 83 to the input of logic inverter 78 by means of resistor 84 and capacitor 86. The output of logic inverter 78 is coupled directly to the input of logic inverter 80. A capacitor 88 is coupled from the output of logic inverter 78 to a normally interrupted or second ground return path B over circuit lead 90. The output of logic inverter 80 is coupled to the input of logic inverter 82 by means of capacitor 92 and resistor 94.

The pulse noise rejection circuit 60 is operable such that when a signal appears across resistor 56 at junction 58 of the hold circuit 50 occurs, it is delayed for approximately 0.1 second or more. The same action occurs upon the closure of the microphone push-button switch 76. Assuming now for sake of illustration that a calling party is on the line, a negative voltage will appear across resistor 56, effectively providing a binary "0" input to the NAND gate 70, whereupon a binary "1" appears at circuit junction 83. This binary "1" signal is applied to the input to the logic inverter 78 through the resistor 84 and capacitor 86 which has an R-C charging time constant of approximately 0.1 seconds. When capacitor 86 charges, the output state of logic inverter 78 will switch to a binary "0". The binary "0" is next inverted by the logic inverter 80 which provides a binary "1" through the capacitor 92 immediately to the third logic inverter 82 whereupon a binary "0" output appears thereat. A short time later, however, capacitor 92 charges through resistor 94, causing the binary output of logic inverter 82 to switch back to a binary "1". This has the effect of providing a negative going pulse on output circuit lead 98.

The binary "1" signal appearing at junction 83 is also coupled by means of circuit lead 100 to the J input of a first control J–K flip-flop 102 and to the clear or reset (R) input of a second control J–K flip-flop 104 shown in FIG. 1. A J–K flip-flop circuit is well known to those skilled in the art, a typical example of which is available from the Radio Shack as part No. 276–019 and comprises an integrated circuit. Furthermore, such circuit is operable that when the J input is a binary "1" while the K input is a binary "0", the Q output will go to a binary "1" when a clock pulse is applied to its C input. Thus whenever a calling party is "on the line", a binary "1" signal will be applied to the J input of flip-flop 102, while a predetermined time later (0.1 seconds) a negative going trigger or clock pulse is applied to the clock input of flip-flop 102, which will cause its Q output to become a binary "1". This binary "1" signal is applied to the endless loop tape recorder 77 for starting its operation. If for any reason there is no logic coincidence of a binary "1" at junction 83 and the delay clock pulse, the flip-flop 102 will not be triggered. Simultaneously with the triggering of flip-flop 102, the time delayed binary "0" output from the logic inverter 78 of the noise rejection circuit 60 is coupled by means of circuit lead 106 to a dual input NAND gate 108 in the automatic power ON/OFF circuit 66 shown in FIG. 3.

Considering now the automatic power ON/OFF circuit 66 in detail, it includes in addition to the NAND circuit 108 a third control J–K flip-flop circuit 110 which has its J terminal and K terminals, respectively, coupled across a first power source 112 ($\mp V_{cc_1} = 6$ volts) whose negative terminal is connected to ground return path A. The clock (C) input to the flip-flop 110 is commonly coupled to junction 58 in the hold circuit 50 by means of capacitor 109 and to the push-button microphone 72 by means of capacitor 111. The output of the NAND gate 108 is coupled to the clear or reset (R) input of the flip-flop 110 while the Q output is connected to the base of transistor 114 by means of resistor 116. A capacitor 118 is coupled across the emitter and collector electrodes of transistor 114 with the emitter being connected to the first ground return path A by means of circuit lead 120. The collector of transistor 114 is connected to circuit lead 122 which connects to the second ground return path B. When transistor 114 is made conductive, normally interrupted ground return path B is connected to the continuous ground return path A. The positive side of the DC source 112 corresponds to a binary "1" signal and as such is applied as a bias to the clock (C) input of flip-flop 110 by means of resistor 124 and to the clear input (R) by means of resistor 126.

In operation, when the ring circuit 16 answers the incoming call and the diode 54 in the hold circuit 50 conducts, a negative pulse appears at circuit junction 58 which is coupled to the clock (C) input of flip-flop 110 by means of capacitor 109. Flip-flop 110 is triggered and the Q output goes to a binary "1" which causes transistor 114 to conduct and act as a closed switch. This couples ground return path B to the negative side of the DC source 112. This effectively provides a current return path for all of the circuits, with the exception of the ring circuit 16 which has a continuous ground return A. The power supply circuit will then be completed through all of the circuitry so long as flip-flop 110 remains in its aforementioned triggered state. It is triggered to its opposite state when the output of NAND gate 108 goes to a binary "0". When flip-flop 110 is clocked, the input to NAND gate 108 from NAND gate 78 appearing on circuit lead 106 is a binary "0". The other input to the NAND gate 108 comprises the $\overline{Q}$ output from flip-flop 102 which is coupled thereto by means of circuit lead 130. When a caller is on the line, the $\overline{Q}$ output of flip-flop 102 is a digital "0", thus making the digital output of NAND gate 108 a digital "1". In order for flip-flop 110 to be reset, both inputs to NAND gate 108 must be a digital "1", which occurs when a caller hangs up his telephone set, thereby removing the negative voltage across resistor 56 and additionally when the flip-flop 102 controlling the endless loop tape recorder 77 is reset. Resistor 124 ensures that the clock (C) input of flip-flop 110 is held at a binary "1" level until it is pulsed from the hold circuit 50 or the microphone push-button switch 76 is closed coupling ground return A thereto by means of capacitor 111. Capacitor 109 will be charged back to a binary "1" level by resistor 124 during a phone call. Resistor 126, on the other hand, ensures that the clear or reset (R) input circuit of flip-flop 110 is held at a binary "1" level until the output of NAND gate 108 goes to a binary "0".

Returning briefly to the pulse noise rejection circuitry 60, its function is to trigger the flip-flop 102 and reset flip-flop 104 only when a caller is on the line. As noted earlier, when the ring circuit 16 answers the incoming call and the hold circuit 50 couples a negative signal to the NAND gate 70, the J input to flip-flop 102 comprises a binary "1" signal while 0.1 of a second later a clock pulse is delivered to the (C) input from logic inverter 82. However, if the signal coming in from the phone line comprises a noise signal, then the enabling signal applied to the J input will not remain, but will return to a binary "0" prior to the clock pulse arriving 0.1 second later, therefore flip-flop 102 is not triggered. Also, if the telephone set of the calling party is hung up immediately, it would cause a noise pulse and the same result would occur.

Figure 3:
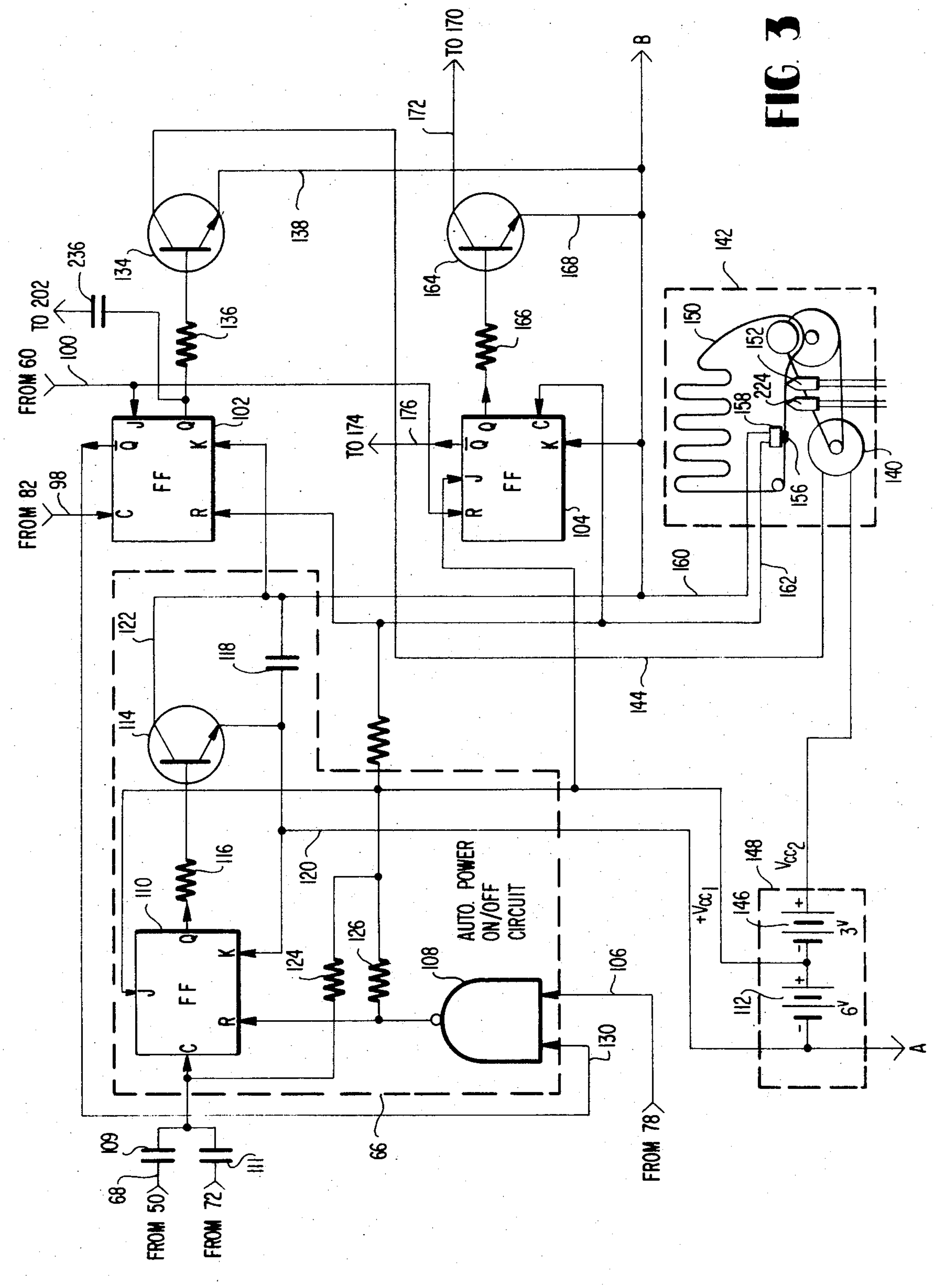
FIG. 3 is an electrical schematic diagram illustrative of the automatically operated power on/off circuit utilized in combination with a pair of J–K flip-flop circuits which control the operation of an endless loop tape recorder having a prerecorded message and a tape recorder for incoming messages respectively.

Directing attention now to FIG. 3 and more particularly to flip-flop 102, the K input goes to a binary "0" when ground return B is completed through to ground return path A by the turn-on of transistor 114. The clock C input is triggered from the output of logic inverter circuit 82 of the pulse noise rejection circuitry 60 shown in FIG. 2. Meanwhile, the J input of flip-flop 102 has become a binary "1" such that when the clock pulse occurs, the Q output goes to a binary "1" which is coupled to the base of transistor 134 by means of resistor 136. The emitter of transistor 134 is returned to ground return path B by means of circuit lead 138 while the collector is coupled to one side of an endless loop tape drive motor 140 located in an endless loop tape deck 142 which is part of the endless loop tape recorder 77 shown in FIG. 1. The connection of the transistor 134 to the drive motor 140 is by means of circuit lead 144. The opposite side of the drive motor 140 is coupled to the positive terminal of a second DC supply source 146. This supply voltage is, for example, a 3.0 volt battery whose negative terminal is connected to the positive terminal of the 6 volt battery 112 thereby providing a $\mp V_{cc_2} = 9$ volts. It should be pointed out that the sources 112 and 146 can be part of a composite power supply 148 which could be configured by other means other than DC batteries as shown.

The Q output of flip-flop 102 turns transistor 134 "on" which activates the drive motor 140 causing an endless loop tape 150 to translate a prerecorded message to a Read/Write head 152. The tape 150 includes a piece of metal foil 156 and after the tape has run its complete length, comes under the influence of a sensing means 158 which has one side thereof connected to ground return B by means of circuit lead 160 and the other side to the clear (R) input of flip-flop 102. The tape sense means 158 applies "0" binary signal to the clear input R of flip-flop 102 which resets the flip-flop, causing transistor 134 to again become non-conductive and stopping the drive motor 140. The $\overline{Q}$ output of flip-flop 102 now goes to a binary "1", which is applied to one input of the NAND circuit 108 in an automatic power on/off circuit 60. This input, however, has no effect on the logic and thus the "on" state of transistor 114 will not be effected.

The tape sense means 158 is also coupled across the K and the clock (C) inputs of flip-flop 104. The Q output is connected to the base of transistor 164 by means of resistor 166. The emitter of transistor 166 is connected to ground return path B by means of circuit lead 168 while the collector thereof is connected to a second tape recorder 170 shown in FIG. 1 by means of circuit lead 172. The tape recorder 170, for example, may be a tape cassette recorder and has for its only purpose the receiving of incoming messages from the caller. The clear R input to flip-flop 104 is connected back to the output of the NAND circuit 70 (junction 83) in the pulse noise rejection circuitry 60 shown in FIG. 2. The Q output is connected to a one-second tone generator 174 shown in FIGS. 1 and 5. When the endless loop 150 comes to a stop, the sensing means 158 couples a binary "0" pulse to the (C) input of flip-flop 104 which causes the Q and $\overline{Q}$ outputs to go to a binary "1" and "0" respectively. Transistor 164 becomes conductive to energize the tape recorder 170 for recording the caller's message, but at the same time the $\overline{Q}$ output which appears on circuit lead 176 pulses the one second tone circuit 174.

The tone circuit 174 may be of any convenient configuration which is adapted to be pulsed into operation. In the specific embodiment of the invention, the tone generator is shown in detail in FIG. 5 and comprises four integrated circuit devices 178, 180, 182 and 184. The circuits 178 and 180 are cross coupled and form a free running multivibrator of a predetermined tone frequency which appears on circuit lead 186 and comprises one input to a dual input NAND gate 182. In order for the signal appearing on circuit lead 186 to appear at the output of NAND gate 182, a binary "1" signal must appear at the other input to the NAND gate 182 which input is coupled to circuit lead 188. The single input to the logic inverter 184 is coupled to circuit lead 176 upon which the $\overline{Q}$ output signal appears. When flip-flop 104 is triggered, a binary "0" signal appears at the input of logic inverter 184 and a binary "1" appears on circuit lead 188. A tone output is coupled to circuit lead 190 by means of capacitor 192 and resistor 194. Circuit lead 190 in turn is coupled back to the telephone line 10 through the ON/OFF switch 14 shown in FIG. 1. When the output of logic inverter 184 goes to a binary "1", capacitor 196 charges through resistor 198 and after a one second interval, returns the binary state of the signal on circuit lead 88 to "0" and thereby decoupling the multivibrator output from circuit lead 190.

Figures 4, 5:
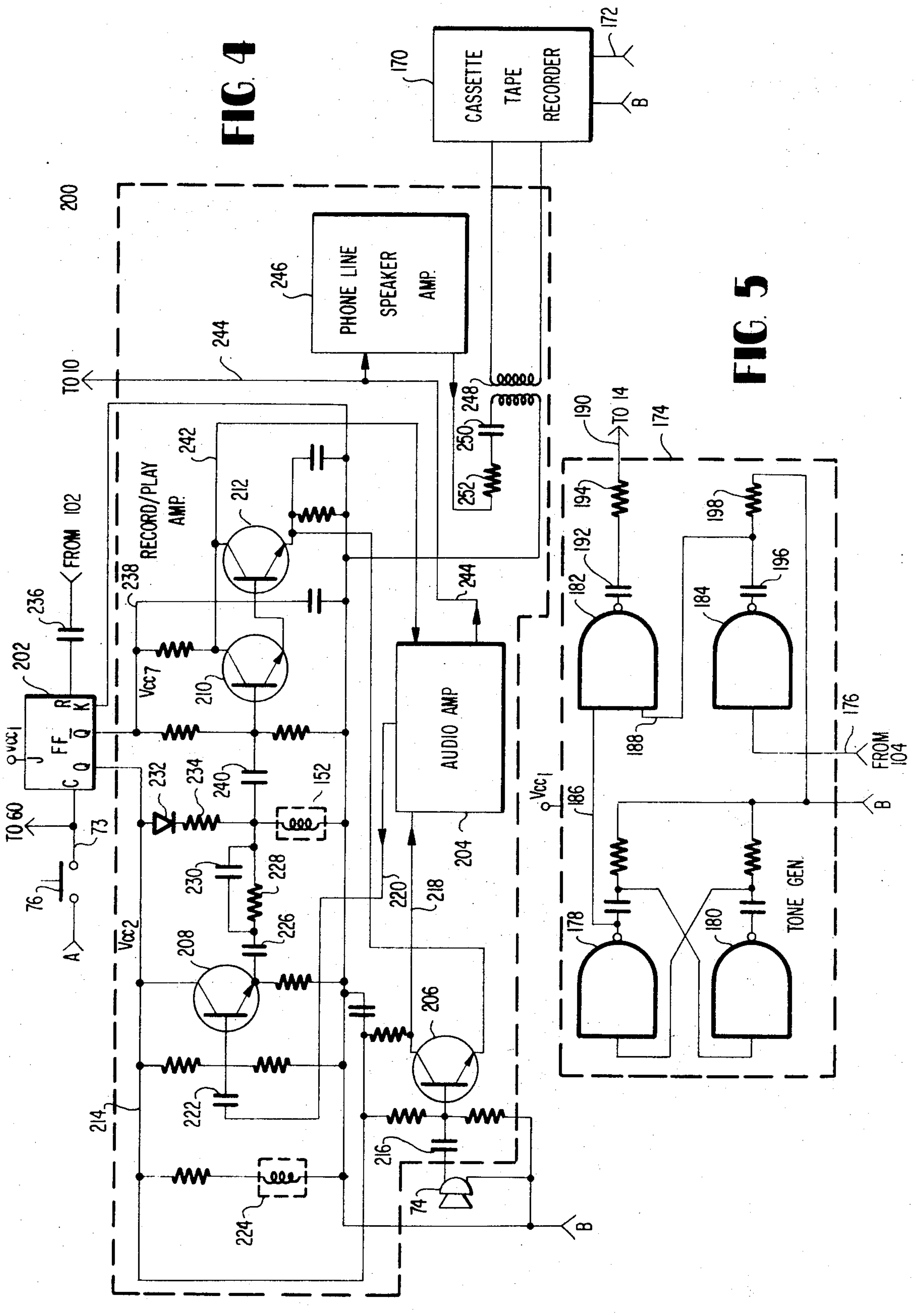
FIG. 4 is a schematic diagram illustrative of the record and playback section of the endless loop tape recorder utilized for coupling a prerecorded message to the telephone line.
FIG. 5 is a schematic diagram illustrative of a typical one second tone generator coupled to the line after the prerecorded message is coupled thereto and prior to the incoming message which is recorded.

In order to complete a discussion of the various circuits utilized, one must also consider the "record/play" amplifier circuitry associated with the endless loop tape recorder 77 and which is shown by reference numeral 200 in FIGS. 1 and 4. Additionally, a fourth J-K flip-flop circuit 202 is utilized to control the record/play amplifier 200. Referring now to FIG. 4, the record/play amplifier 200 includes an audio amplifier section 204 which has a dual function of receiving a message from the subscriber by means of microphone 74 which is the recorded on the endless tape 150 (FIG. 3) and thereafter coupling a prerecorded message to the telephone line 10 in response to a telephone call which is to be answered. The circuitry 200 additionally includes four transistors 206, 208, 210 and 212 and their associated components.

Assuming that the subscriber wishes to prerecord a message on the endless loop tape 150 of the recorder 77 shown in FIG. 1, the microphone switch contacts 76 are momentarily closed whereupon a digital "0" signal is applied to the clock (C) input of J–K flip-flop 202. The Q output goes to a binary "1" which is now made to equal $+V_{cc_2}$ and appears on circuit lead 214. The signal from the microphone 74 is coupled to the base of transistor 206 by means of capacitor 216 where it is then coupled into the audio amplifier section 204 from the collector of transistor 206 by means of circuit lead 218. This signal is amplified and coupled from the amplifier 204 by means of circuit lead 220 to the base of transistor 208 which is an emitter-follower configuration. The emitter is coupled to the record/play head 152. The presence of the $+V_{cc_2}$ on circuit lead 214 also powers an erase head 224 during the process of prerecording the message. The prerecorded message is coupled from the emitter of transistor 208 by means of the resistor-capacitor combination of capacitor 226, resistor 228 and capacitor 230. The record/play head 152 is biased from the supply potential $+V_{cc_2}$ by means of diode 232 and resistor 234 which are connected in series to the record head. Meanwhile, the tape drive motor 140 of the endless loop tape recorder 104 has been energized by means of the microphone switch 76 being connected to the input of the NAND circuit 70 and the pulse noise rejection circuit 60, shown in FIG. 2.

Assuming now that the prerecorded message is on the endless loop tape 150, and a caller is on the telephone line and is seized as previously described, flip-flop 202 will be in a "reset" state from a previous call by means of the Q output from flip-flop 102 going to a binary "0" at the end of operation. This binary "0" signal is coupled to the clear R input of flip-flop 202 by means of capacitor 236. When the apparatus is now activated, the $\overline{Q}$ output of flip-flop 202 will be a binary "1". When the power circuit 66 operates to turn on transistor 114 and thereby complete the ground return B, the supply potential $+V_{cc_2}$ will now appear on circuit lead 238 which is coupled to transistor 210 and 212. The activation of the endless loop tape recorder 77 by means of flip-flop 102 which has been triggered from the pulse noise rejection circuit 60, causes the recorded signal sensed by the play/record head 152 to be coupled to the base of transistor 210 by means of capacitor 240. The transistors 210 and 212 are connected in a Darlington configuration, the output of which is coupled to the audio amplifier circuit 204 by means of circuit lead 242. This message signal is now amplified and fed to the phone line 10 by means of circuit lead 244.

When the tape loop 150 has played the prerecorded message and the metal foil 156 is sensed by the sensor means 158, the one-second tone pulse generator 174 is activated as previously described and flip-flop 104 energizes the second tape recorder 170 for receiving an incoming message. The incoming message when the tape recorder 170 is turned on is coupled thereto from the phone line 10 by means of another amplifier 246 whose output is capacitively coupled to the input of the tape recorder 170 by means of transformer 248, capacitor 250, and resistor 252. The second recorder 170 is preferably of the type known as the cassette tape recorder so that the incoming messages recorded thereon can be played at a later time on any cassette type apparatus.

Figure 6:
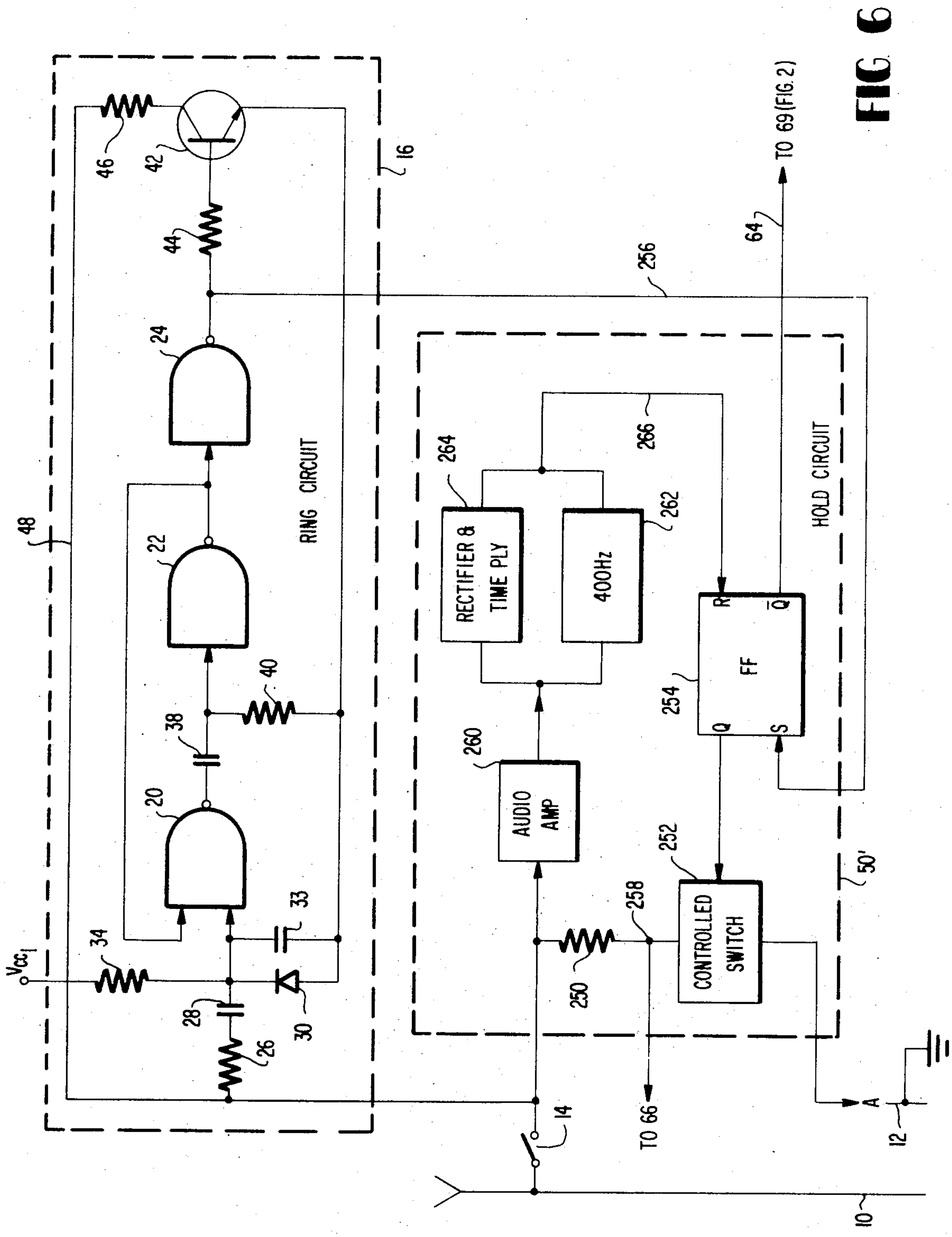
FIG. 6 is a block diagram illustrative of a second embodiment of a old circuit forming a portion of the subject invention.

Turning now to FIG. 6, there is disclosed a second configuration of a hold circuit 50' utilized in combination with the ring detector circuit 16 shown in FIG. 1 which is particularly adapted for use with a "touch-tone" dialing telephone system. It comprises a resistor 250 substantially equal to an "off-hook" telephone set (300Ω) coupled across the telephone line pair 10 and 12 by means of a controlled switch 252 which may be of any desired semiconductor device such as a transistor, SCR, TRIAC or the like. The controlled switch is normally non-conductive but is adapted to be rendered conductive by the Q output of a flip-flop circuit 254 having its set (S) input coupled to the output of logic inverter 24 of the ring detector circuit 16 by means of circuit lead 256. When the output of logic inverter 24 becomes a binary "1" upon the reception of a ring signal, it triggers flip-flop 254 and its Q output becomes a binary "1" whereupon the controlled switch is rendered conductive placing resistor 250 across the lines 10 and 12. The $\overline{Q}$ output is coupled to the pulse noise rejection circuit 60 and applies a binary "0" to input 69 of the NAND gate 70 as required. Circuit junction 258 which is at ground potential when the controlled switch 252 is "on" is coupled to the C input of J–K flip-flop 110 in the automatic power on/off circuit by means of capacitor 109 shown in FIG. 3 for applying power to the other circuitry described previously.

While the ground return path A was heretofore only necessary for the ring detector circuit 16 in order to continuously apply power thereto in the STANDBY state, the hold circuit 50' must at least continuously apply power to flip-flop 254 in the STANDBY state as well.

In addition, the hold circuit 50' also includes an audio amplifier 260 which has its input coupled to the telephone line 10 through the ON/OFF switch 14. The output of the audio amplifier is commonly coupled to a 400Hz or "dial-tone" pass filter 262 and a rectifier-time delay circuit 264. The output of circuits 262 and 264 are commonly coupled to reset (R) input of the flip-flop 254 by means of circuit lead 266. Thus when a caller hangs up his telephone set immediately upon calling or after leaving a message, a "dial-tone" will appear on the line 10 after a short time delay. The filter 262 then passes an output to the flip-flop 254 which then resets the flip-flop reverting it to a state wherein the Q and Q output goes to a binary "0" and "1", respectively, and the controlled switch 252 is deactivated to remove resistor 250 from across the lines 10 and 12 and the answering system assumes a STANDBY state. The purpose of the rectifier and time delay circuit 264 is to be in response to audio signals on the phone line and to trigger reset of flip-flop 254 upon no audio signal on the line.

Thus, one employing the subject invention can by means of the push-button microphone switch 76 trigger the flip-flop circuit 202 and complete the ground return path B through activation of the automatic power on/off circuit 66 and record a message on the endless loop tape 150 which has been energized by flip-flop circuit 102 by the application of a coincident enabling signal and a clock signal thereto from the pulse noise rejection circuit 60. When the message is recorded, the recorder 77 will be shut off by means of the sensing means 158 and the system will go into a STANDBY state by interrupting the ground return path B. Ground return A, however, is not interrupted and therefore power is still supplied to the ring detector circuit 16. Thereafter when the on/off switch 14 is closed, an incoming call on telephone line 10 will be sensed by the ring circuit 16 and an impedance substantially equal to an "off-hook" telephone set will be momentarily placed across the lines 10 and 12 to seize it. Next the hold circuit 50 senses the voltage across the answer telephone line, maintains seizure and couples a signal to the pulse noise rejection circuit 60 which delays the signal for one tenth of a second or more to eliminate the premature hang up by the caller or a transient from triggering the apparatus. After the 0.1 second, the pulse noise rejection circuit 60 energizes the flip-flop 102 which starts the endless loop tape recorder 105. At the same time the pulse noise rejection circuit resets flip-flop 104 to deenergize the other tape recorder 170.

Triggering the flip-flop 102 causes the prerecorded message on the endless loop tape 150 to be played into the record/playback amplifier 200 which in turn has its output coupled back to the telephone line 10 through the switch 14. At the end of the playback of the prerecorded message on the endless loop tape 150, the metal foil 156 is again sensed and the control flip-flop 102 is reset but flip-flop 104 is now clocked. The one-second tone generator circuit 174 is also pulsed by the flip-flop 104 and the cassette tape recorder 170 is energized thereby, whereupon the caller's message is fed through the record playback amplifier 200 to the tape recorder 170. When the caller hangs up, the hold circuit 50 output changes and the pulse noise rejection circuit 60 feeds a binary signal from logic inverter 78 to the automatic power on/off circuit 66 to interrupt ground return B and thus remove power from the circuitry with the exception of the ring detector 16.

Having thus disclosed and described what is at present considered to be the preferred embodiment of the subject invention,

I claim:

1. A telephone answering system independently operable with respect to a telephone receiving and transmitting set which is to be answered and said telephone set remains in an "on-hook" state throughout operation of said system, comprising, in combination:

circuit means connected to a telephone line pair coupled to said telephone set for sensing a ringing signal thereon, seizing and maintaining seizure of said telephone line pair by coupling a predetermined impedance across said line pair, and providing an output signal of a first type when said telephone line pair is unseized and an output signal of a second type when said telephone line is seized;

pulse noise rejection circuit means for preventing false initiation of operation of the system coupled to said circuit means and providing a first binary output signal and a delayed binary output signal in response to said output signal of said second type from said circuit means;

a first bistable control circuit for controlling message transmitting means, coupled to said pulse noise rejection circuit means, and responsive to said first binary signal and said delayed binary output signal, becoming operable to switch to a first operating state when said binary output signals from said pulse noise rejection circuit are coincident in time to provide first energizing signal;

message transmitting means coupled to said first bistable control circuit, being rendered operative in response to said first energizing signal to couple a prerecorded message to said telephone line, and said message transmitting means becoming automatically inoperative after a predetermined elapsed time and generating a first control signal at said time, said first control signal being coupled back to said first bistable control circuit whereupon said first bistable control circuit switches to a second operating state;

a second bistable control circuit for controlling message receiving means, coupled to said message transmitting means and being responsive to said first control signal generated thereby to switch to a first operating state and provide a second and third energizing signal, said second bistable control circuit additionally being coupled to said pulse noise rejection circuit means and being responsive to said first binary output signal to switch to a second operating state; and message receiving means having input means coupled to said telephone line and coupled to said second bistable control circuit, being rendered operative in response to said second energizing signal to receive a message transmitted thereto over said telephone lines.

2. The apparatus as defined by claim 1 and additionally including a tone pulse generator circuit having output means coupled to said telephone line and coupled to said second bistable control circuit and being responsive to said third energizing signal to translate a tone pulse to said telephone line when said third energizing signal is received therefrom.

3. The invention as defined by claim 1 wherein said message transmitting means comprises a first recorder means and said message receiving means comprises second recorder means.

4. The telephone answering system as defined by claim 1 wherein said first and second bistable control circuit, respectively, comprise a first and second flip-flop circuit.

5. The invention as defined by claim 4 and additionally including controlled power application circuit means coupled to said circuit means and being responsive to said output signal of said second type to connect power to said pulse noise rejection circuit means, said first and second flip-flop circuit, said message transmitting means, and said message receiving means, and including circuit means for becoming inoperative and disconnecting power therefrom when said message transmitting means becomes inoperative coincident in time with said output signal of said first type.

6. The invention as defined by claim 5 and additionally including means for applying a message to said transmitting means and circuit means for rendering said pulse noise rejection circuit operative to cause said first flop-flop circuit to switch states, thereby energizing said message transmitting means and rendering said controlled power application circuit operative to apply power thereto.

7. The system as defined by claim 4 when said circuit means comprises:

a ring signal detector for sensing a ringing signal applied to said telephone line pair and providing a control signal in the event thereof; and hold circuit means coupled to said telephone line pair and including an impedance substantially equal to the "off-hook" impedance of a telephone and a normally open voltage controlled switch connected in series across said telephone line pair, control circuit means coupled between ring signal detector and said voltage controlled switch, said control circuit meams being responsive to said control signal to close said voltage controlled switch to connect said impedance across said telephone line pair, and means responsive to another telephone line pair operating state coupled to said control circuit means for opening said controlled switch to disconnect said impedance from across said telephone line pair.

8. The system as defined by claim 7 wherein said control circuit means comprises a flip-flop circuit and said controlled switch comprises a semiconductor device.

9. The apparatus as defined by claim 4 wherein said pulse noise rejection circuit comprises a digital time delay circuit responsive to said output signal of said second type and including at least one logic inverter circuit including input means responsive to said output signal of said second type to cause said logic inverter to switch output logic states after a predetermined time delay.

10. The apparatus as defined in claim 9 wherein said input means of said at least one logic inverter circuit includes an R-C charging circuit.

11. The invention as defined by claim 10 and additionally including a dual input NAND logic gate having one input coupled to said hold circuit and an output coupled to said R-C charging circuit and also to said first and second flip-flop circuit.

12. The invention as defined by claim 4 wherein said power application circuit means comprises a third flip-flop circuit and normally open voltage controlled switch means coupled to said third flip-flop circuit for being rendered closed thereby and making a complete power circuit path, and additionally including first circuit means coupled to said first recited circuit means for triggering said third flip-flop circuit when said telephone line is seized and said output signal of said second type appears, and second circuit means coupled to said first flip-flop and said pulse noise rejection circuit receiving signals therefrom for resetting said third flip-flop when said message transmitting means is rendered inoperative and said output signal of said first type is present.

13. the apparatus as defined by claim 12 wherein said voltage controlled switch means comprises a transistor.

14. The invention as defined by claim 12 wherein said second circuit means comprises a NAND logic gate.

15. The system as defined by claim 4 wherein said circuit means comprises:

a ring signal detector circuit for sensing a ringing signal applied to said telephone line pair, said detector circuit including circuit means responsive to said ringing signal to initially apply said predetermined impedance across said telephone line for a predetermined period of time, wherein said impedance is substantially equal to the impedance of an "off-hook" telephone set for seizing the telephone line and effectively answering an incoming call, said detector circuit additionally including circuit means for becoming automatically inoperative after said predetermined period of time and uncoupling said impedance from the telephone line;

hold circuit means coupled to said telephone line pair providing an output signal of a first type when said telephone line is unseized and an output signal of a second type when said telephone line is seized and additionally including circuit means applying another impedance substantially equal to the "off-hook" impedance of a telephone set after said predetermined period of time for retaining line seizure.

16. The apparatus as defined by claim 15 wherein said hold circuit means comprises normally open switch means and an impedance substantially equal to the impedance of an "off-hook" telephone set coupled in series across said telephone line, said switch means being operable to be rendered closed when said telephone line is seized by said ring signal detector circuit.

17. The apparatus as defined by claim 16 wherein said switch means comprises a semiconductor device.

18. The apparatus as defined in claim 17 wherein said semiconductor device comprises a diode poled to become conductive when a negative voltage appears across said telephone line.

19. The apparatus as defined by claim 15 wherein said ring signal detector circuit comprises a binary logic circuit having a first logic output state in absence of a ringing signal and being triggered to a second logic output state when a ringing signal is applied to said telephone line pair and additionally including circuit means for reverting back to said first output state after said predetermined time period;

normally open voltage controlled switch means coupled to said binary logic circuit, being rendered operatively closed in response to said second logic output state; and said predetermined impedance means substantially being coupled by means of said switch means across said telephone line when closed.

20. The apparatus as defined by claim 19 wherein said voltage controlled switch means comprises a transistor.

21. The apparatus as defined by claim 19 wherein said binary logic output circuit includes;

a NAND logic gate first and second inputs;

first circuit means coupled to said first input of said NAND gate to provide a binary signal of a first binary logic sense, second circuit means coupled from said telephone line pair to said first input of said NAND gate to provide a binary signal of a second binary logic sense when a ringing signal appears on said telephone line;

an R-C charging circuit;

a first binary logic inverter circuit coupled to the output of said NAND circuit means of said R-C charging circuit;

a second binary logic inverter circuit coupled to the output of said first logic inverter and having an output coupled to said voltage controlled switch means and additionally including circuit means coupling the output of said first logic inverter back to said second input of said NAND gate;

said ringing signal changing the logic output state of said NAND logic gate to said first binary logic sense, said first logic sense signal being coupled in sequence to said first and second logic inverter to render said transistor conductive, said R-C charging circuit thereafter charging and after said predetermined time interval causing the input of said first and second logic inverters to change output states and render said transistor non-conductive.

22. The apparatus as defined in claim 21 wherein said first circuit means comprises a resistor and a capacitor connected in series across a fixed voltage and said capacitor is connected across said first input of said NAND logic gate; and said second circuit means includes a normally non-conductive diode connected across said capacitor and capacitive coupling means coupling said diode to said telephone line pair and becoming conductive when said ringing signal appears on said line.

* * * * *